United States Patent Office 2,726,967
Patented Dec. 13, 1955

2,726,967

PAPER BACKED ADHESIVE TAPE

Laszlo Walter Eger, East Hampton, Conn., and Edward William Engel, New Brunswick, N. J., assignors to Permacel Tape Corporation, a corporation of New Jersey No Drawing. Continuation of application Serial No. 556,494, September 29, 1944. This application October 23, 1948, Serial No. 56,258

5 Claims. (Cl. 117—76)

This invention relates to flexible, non-woven fibrous sheeting impregnated with a butadiene copolymer deposited from aqueous dispersion to improve internal strength and to impart to the sheet a high degree of non-hygroscopicity. The invention also relates to the combination of such sheeting with a coating of normally adhesive material, i. e., to a pressure-sensitive adhesive tape.

The internal strength of the improved sheet is insured by the bonding together of the fibers in the sheet in such manner that the sheeting will possess high tensile strength and not split into laminations or "delaminate" even though relatively large forces are applied tending to separate the fibers. Non-hygroscopicity results from the nature of the impregnant and the extent to which it is introduced into the sheet.

Pursuant to the invention, a flexible, porous, fibrous web, such as paper, which consists of matted fibers, or unwoven fibrous sheeting such as that manufactured by the Chicopee Manufacturing Corporation and sold under the trade name "Masslinn," or other highly porous fibrous webs selected according to the intended use, is impregnated with a concentrated aqueous dispersion of a copolymer of butadiene and an unsaturated compound in which the solid particles of the dispersion are preferably less than 4 microns in diameter. The preferred unsaturated compounds are mono-unsaturated compounds, and may be aromatic, such as styrene, or aliphatic, such as the unsaturated nitriles (e. g., acrylic nitrile, alpha-methacrylic nitrile, alpha-ethacrylic nitrile, alpha-isopropylacrylic nitrile), isobutylene, and methacrylates such as methyl methacrylates, their equivalents, and homologs. For convenience, wherever reference hereinafter is made to copolymers of butadiene and styrene, it should be understood, unless otherwise noted, that the intention is to include within the scope of these terms, the other copolymers of butadiene that have been mentioned. The limitation in the size of the solids particles in the dispersion is to insure that the particles will enter the pores of the fibrous web. With most sheeting suitable for practising the invention, this will occur if the particles are predominantly less than 4 microns in diameter.

The flexible sheet when treated preferably should be saturated, i. e., it should include as much impregnant solids as possible, ordinarily to the extent of between 40 to 60 percent of the total weight of the sheet. Saturation to this degree may be obtained by using an aqueous dispersion having a solids content comprising approximately 30 to 60 percent by weight, selected concentration depending upon the characteristics of the porous web. In other words, the solids content in the dispersion is made larger according to the greater ability of the sheet to absorb solids.

The improved product possesses many advantages from the standpoint of manufacture and use. Impregnant preparation is simplified. The use of undesirable, inflammable and toxic solvents is eliminated. Vulcanizing or curing steps are unnecessary. The product is extremely soft and pliable. It has high tensile strength and great resistance to fiber separation. Thin sheets of the impregnated web are very translucent. The color is light, although, by the simple addition of coloring agents to the original web or to the impregnant, various attractively colored sheets may be obtained. Furthermore, the improved sheet has good elongation and has relatively high porosity, combined with good resistance to those commercial solvents with which it is most apt to come in contact in normal industrial use.

The sheets are well bonded internally and therefore are particularly suitable for protective packaging or in conjunction with normally adhesive material as a backing or interliner for adhesive tapes, or in the printing industry where tacky printing inks have a tendency to resist the separation of stacked sheets. As a backing for a pressure-sensitive adhesive tape, the sheet will withstand, without splitting or delamination, the sudden and forceful removal of the tape from surfaces to which it has adhered, enabling the tape to be used over and over again. It has been found, too, that the application of pressure-sensitive adhesives to the improved sheet seldom requires a primer to anchor the adhesive to the backing and that backsize may be avoided with many adhesives customarily used. Several costly manufacturing steps are thus eliminated when using the improved sheeting as the backing for a pressure-sensitive adhesive tape.

The improved sheeting gives satisfactory service even after long storage or under extremes of climatic conditions where other considerably more expensive products have failed. It may be used to great advantage in instances where very high or very low temperatures are encountered. By way of example, it will retain its internal and tensile strength and will stay flexible, even after prolonged exposure to temperatures above 300° F. Tests have shown that after exposure to this temperature for four and a half hours, the sheet encounters no change of properties except for slight discoloration. At —20° F. and below the sheet performs to satisfaction the same as at normal temperatures.

From what has been said, it is manifest that there has been produced a sheet having many applications which hitherto were barred to the use of internally bonded, fibrous, non-hygroscopic sheets. For instance, in the form of a backing for normally adhesive tapes and in other forms as well, the product can be used in the aircraft, automotive, typewriter, and other machine industries to mask parts during application and high temperature treatment of baked finishes and enamels. The sheets will perform equally well in similar masking operations in finishing electrical, radio, and electronic equipment. The ability of the sheet to resist cold is of great importance in connection with aircraft designed for high altitude flying, and in the locker industry for packaging foods and other perishables for long storage at low temperatures.

While the foregoing advantages may be obtained using standard butadiene styrene copolymers as the impregnant for the sheet, the surprising discovery has been made that the tensile and internal strength is vastly improved if butadiene styrene copolymers are used having a higher than conventional ratio of styrene to butadiene. Heretofore, the usually available butadiene styrene copolymers, such as Buna S or GRS had a styrene content of about only 25 percent by weight. In so far as this invention is concerned, however, it is preferred that the styrene content of the butadienne styrene copolymer range between 35 and 70 percent by weight. The increased olefin content reduces the elastic properties and improves the plastic properties of the copolymer, thereby rendering the copolymer substantially superior as an impregnant for fibrous sheeting.

Most commercial latices of this general type, i. e. aqueous dispersions of butadiene styrene copolymers, are emulsified with an organic soap such as potassium rosinate or sodium stearate. For the purposes of this invention, any emulsifying or dispersing agent which provides a stable dispersion of the copolymer will suffice. A stable dispersion will usually result where the amount of dispersing agent ranges between ½ and 15 percent of the copolymer.

Various anti-oxidants well known to the art are used as preservatives for butadiene styrene copolymers and their latices. The presence of such anti-oxidants in the aqueous dispersions used as impregnants in accordance with this invention will likewise prolong the life of the resultant product. For instance, there is contained in one creamed latex made by a domestic source of supply and which has been found satisfactory from ½ to 10 percent (based on the weight of the copolymer) of "BLE," an anti-oxidant containing an acetone diphenyl amine condensation product and diparaphenyl guanidine. In any case, the provision of dispersing agents and anti-oxidants for butadiene copolymers and their latices is well known in the art and is not considered within the purview of this invention. It should, however, be stated that any satisfactory anti-oxidant or dispersing agent suitable for the copolymer latex used will perform to satisfaction in the improved impregnated web.

Creamed dispersions of butadiene styrene copolymer suitable for practising the invention may be obtained commercially. For example, there is one containing equal parts of the polymers and including anti-oxidants and dispersing agents, sold commercially under the number 5011 by the Naugatuck Chemical Division of U. S. Rubber Company. A similar dispersion is sold under the name Hycar Os10 by the Hycar Chemical Company. Other suitable copolymer dispersions have been made experimentally or are available commercially from these or other manufactures.

Many variations of our procedure will occur to those skilled in the art. The following examples of preferred embodiments of the invention may serve to explain the same more thoroughly. In the examples, the aqueous dispersions referred to contain the usual amount of addition agents, such as anti-oxidants and dispersing agents.

*Example I*

As the fibrous sheeting, there may be used, by way of example, a highly porous absorbent paper having a weight of the order of 27 lbs., per ream of 480 sheets, 24" x 36" in size. The paper preferably should be unsized and uncalendered and may have rugosities such as are obtained by creping or embossing. While some wet strength may be desirable from the standpoint of handling the sheet during processing, it has been found that the best product results if paper having no initial wet strength is used. For a web or sheet of the character mentioned, excellent results may be obtained using an impregnating bath containing a concentration of substantially 40 percent solids, including the addition agents, and copolymers comprising by weight 39 to 50 percent styrene and 50 to 61 percent butadiene. Variations in the amounts and types of vinyl copolymers are of course permissible as long as there is present a substantial amount, say, 35 percent styrene or substitute therefor. The sheet is led through the impregnating bath, preferably with a short flotation period preliminary to submersion. In its weakened condition the sheet should be subjected to no strain. On slow drying, conveniently done in a festoon drier at about 100° F., a product will result having all of the excellent properties previously enumerated. It is extremely well bonded internally and will permit the repeated application and fast removal of normally tacky pressure-sensitive adhesives without splitting or delamination.

*Example II*

In this modification, the fibrous sheeting used was a porous Masslinn web, weighing 1.0 oz. per square yard which, in weight, is equivalent to paper of 20 lbs. per ream of 480 sheets 24" x 36" in size. The impregnant was loaded with a reinforcing carbon black to improve its strength characteristics. Carbon black may be used for this purpose with much satisfaction in amounts up to 60 percent of the solids content of the dispersion in instances where color is not a factor. The Masslinn web was led through the bath and then dried as in Example I. The preferred impregnant composition for a web of this character contains 48 percent solids as follows:

|  | Percent by weight |
|---|---|
| Butadiene (48%)-styrene (52%) copolymer | 75 |
| Channel Black | 25 |

A suitable Channel Black is manufactured and sold in this country by the Columbian Carbon Company under the designation D-33.

As previously stated, the improved product does not necessitate the use of curing or vulcanizing steps, although some compounders may prefer them. Slightly higher tensile strength and better solvent resistance are the resulting advantages, although the improved properties are obtained at the expense of increased stiffness and increased processing time which results from the more complicated impregnant preparation and the in situ cure of the impregnant.

Where curing steps are desirable, there may be added to the dispersion 1 to 5 per cent each of zinc dibutyl dithiocarbamate, tetramethyl thiuram disulfide and sulfur based on the butadiene copolymer content of the impregnant, or the same percentages of zinc dibutyl dithiocarbamate, zinc oxide and sulfur. Following drying, the sheet is cured for at least one half hour at 250° F.

The invention has been described in its preferred form but many modifications thereof are included within its spirit. It should be understood, therefore, that the invention is to be limited only by the prior art and the scope of the appended claims.

This application is a continuation of application Serial No. 556,494, filed September 29, 1944, and now abandoned.

What is claimed is:

1. A normally tacky and pressure-sensitive adhesive tape having a flexible, internally bonded paper backing comprising a thin web formed of paper fibers, originally having an open, highly porous structure, of the type conventionally employed in the formation of paper backed pressure-sensitive adhesive tapes, whose original flexibility, thinness and weight are substantially those of a paper sheet of the order of approximately 27 lbs. per ream of 480 sheets 24" x 36" in size, additionally internally bonded by the bonding together of the fibers thereof by polymeric particles deposited in the formed web from an aqueous dispersion whose solids content is approximately 30 to 60% of its weight, said polymeric particles forming approximately 40 to 60% of the weight of said internally bonded web and consisting essentially of unvulcanized particles of a copolymer of butadiene and an initially unsaturated compound present in the copolymer to the extent of about 35 to 70% by weight thereof and selected from the group consisting of styrene, acrylic nitriles, isobutylene, and the methacrylates, and a normally tacky and pressure-sensitive adhesive united to said backing in manner such that the adhesive tape is removable from a suitable surface to which it is applied without splitting, said internally bonded web having internal strength sufficient to render it immune to splitting and delamination when, in a roll of the tape, it is subjected to the forces exerted by the adhesive of an overlying ply of the tape in the unwinding thereof, and being characterized by its ability to retain its internal and tensile strength and its flexibility upon exposure to temperatures ranging from at least the boiling point to at least the freezing point of water.

2. A normally tacky and pressure-sensitive adhesive tape, having particular utility as a masking tape, and according to claim 1, wherein the thin web of paper fibers is uncalendered and has rugosities such as are obtained by creping.

3. A normally tacky and pressure-sensitive adhesive tape according to claim 1, wherein the particles in the aqueous dispersion are predominantly less than 4 microns in diameter.

4. A normally tacky and pressure-sensitive adhesive tape according to claim 1, wherein the aqueous dispersion includes a proportion of strength imparting non-polymeric finely divided filler.

5. A normally tacky and pressure-sensitive adhesive tape according to claim 1, wherein the aqueous dispersion includes a proportion of strength imparting finely divided carbon black.

References Cited in the file of this patent

UNITED STATES PATENTS

| | | |
|---|---|---|
| 1,958,821 | Haarburger | May 15, 1934 |
| 2,206,899 | Kellgren | July 9, 1940 |
| 2,335,124 | Konrad | Nov. 23, 1943 |
| 2,351,498 | Fowler | June 13, 1944 |
| 2,393,133 | White | Jan. 15, 1946 |
| 2,416,232 | Soday | Feb. 18, 1947 |
| 2,424,923 | Edgar et al. | July 29, 1947 |
| 2,441,523 | Ward | May 11, 1948 |
| 2,447,538 | Rust | Aug. 24, 1948 |

FOREIGN PATENTS

| | | |
|---|---|---|
| 838,906 | France | Dec. 16, 1938 |

OTHER REFERENCES

Paper Trade Journal, November 5, 1942.